United States Patent [19]

Dague et al.

[11] Patent Number: 5,822,173
[45] Date of Patent: Oct. 13, 1998

[54] CONDITION RESPONSIVE ELECTRICAL APPARATUS HAVING IMPROVED LOW COST HOUSING

[75] Inventors: Bryan J. Dague; Steven Beringhause, both of Norton, Mass.; Alan G. Amore, Cumberland, R.I.

[73] Assignee: Texas Instruments Incorporated, Dallas, Tex.

[21] Appl. No.: 655,116

[22] Filed: May 29, 1996

[51] Int. Cl.⁶ ...................................................... H01H 35/34
[52] U.S. Cl. ...................... 361/283.3; 73/718; 200/61.25; 200/83 Q
[58] Field of Search ............................... 92/13.2, 96, 101; 29/622; 73/718, 724; 361/280, 283.3, 283.4; 200/83, 61.25, 51 R; 340/611, 626

[56] References Cited

U.S. PATENT DOCUMENTS 3,584,168  6/1971  Halpert et al. .
4,875,135  10/1989  Bishop et al. .
5,043,841  8/1991  Bishop et al. .

Primary Examiner—Gerald P. Tolin
Attorney, Agent, or Firm—Russell E. Baumann; Richard L. Donaldson; Rene' E. Grossman

[57] ABSTRACT

A housing member (100, 100', 100", 100''') used to interface with a coupling of a fluid pressure source and to house a pressure sensing assembly is shown having a metallic tubular sidewall with a cylindrical first portion (102), a non-cylindrical second portion (108, 108') and intermediate third portion (112, 112', 112") with a plastic body member (114, 114', 114") disposed, as by insert molding, within the tubular sidewall. The plastic body member has a base wall portion (116) extending across the sidewall at the intermediate, third portion (112) and has an elongated portion (120, 120') with a threaded bore. The second portion of the sidewall extends along a longitudinal axis at least as far as the elongated portion of the plastic body member. In one embodiment a metallic insert (152) forms a continuation of the molded plastic thread and in another embodiment inwardly extending groove (160) of second portion (108') of the tubular sidewall reinforces the molded plastic thread. The housing member is adapted to receive a pressure sensing mechanism within the first portion (102) which portion is attached to a connector or the like by clamping the outer distal end (106) thereto.

22 Claims, 5 Drawing Sheets

５,822,173

CONDITION RESPONSIVE ELECTRICAL APPARATUS HAVING IMPROVED LOW COST HOUSING

FIELD OF THE INVENTION

This invention relates generally to electrical apparatus for sensing a selected condition such as pressure and more specifically to such apparatus having an improved, low cost housing.

BACKGROUND OF THE INVENTION

Condition responsive electrical apparatus, such as a pressure responsive capacitive transducer or a pressure switch typically comprise an open-ended cup-shaped housing member which serves to house the pressure sensing assembly of the apparatus and also provides a fluid pressure receiving port to interface with a fluid pressure source. The pressure receiving port typically includes a threaded bore for reception of a threaded coupling communicating with a fluid pressure source to be monitored. The housing generally has a non-circular, hexagonal configured portion to facilitate installation of the apparatus on the threaded coupling. The housing also has a generally cylindrical sidewall which forms a recess to receive the pressure sensing assembly with the distal end of the sidewall crimped over an electrical connector which closes the open end of the housing.

A conventional way of making the housing is by machining a cylindrical blank or a cold headed blank of suitable material, such as steel, using a screw machine. Although this procedure has been employed for many years in large volume production, it results in a significant amount of waste material. A separately formed pressure port and housing member welded together to form a unitary housing for receiving the pressure sensing assembly and the fluid pressure interface is also conventional, as shown in U.S. Pat. No. 3,584,168 relating to a pressure switch; however, this adds additional operations and attended cost. Attempts have also been made to mold the housing from plastic material; however, such housings are generally useful only when used in systems in which low pressure is to be monitored. That is, typically it is recommended that only finger pressure be used when mounting plastic housings onto a threaded coupling in order to prevent stripping of the threads and to prevent damage to the hexagonal configuration due to slipping of a torque applying wrench. A higher level of torque is required with high pressure monitoring to provide an adequate seal in turn requiring the use of a wrench which, as stated above, can easily result in damage to the hexagonal configuration. Another undesirable characteristic involved with the use of plastic, particularly with high torque levels used with high pressure monitoring, is that as the housing is screwed in place the plastic wall through which the threaded bore of the port fitting extends tends to buckle and move radially outwardly causing the wall to split when high torque is applied. Yet another undesirable characteristic relates to a change in release torque over time. That is, when a plastic housing is secured onto a coupling and bottoms out there will be some deflection of plastic which provides a force against unscrewing the housing. Over time the plastic relaxes with a result that the release force can become undesirably low causing unintended decoupling.

SUMMARY OF THE INVENTION

It is therefore an object of the invention to provide a condition responsive electrical apparatus which overcomes the prior art limitations noted above. Another object of the invention is the provision of an improved, low cost housing member for receiving a pressure sensor assembly and for providing an interface for a fluid pressure useful in condition responsive electrical apparatus.

Briefly, in accordance with a preferred embodiment of the invention, an improved housing member for receiving a pressure sensor assembly and for providing an interface with a fluid pressure source comprises an outer metallic tubular sidewall having a cylindrical first portion extending along a longitudinal axis in a first direction to a first distal end, a second portion having a non-cylindrical section extending along the longitudinal axis in a second, opposite direction, to a second distal end and a third portion intermediate to the first and second portions. A plastic body is disposed inside the outer tubular sidewall, as by insert molding, and has a base wall extending across the intermediate third portion of the outer tubular sidewall lying in a plane generally perpendicular to the longitudinal axis. The plastic body has an elongated portion extending from the base wall portion along with the longitudinal axis in the second direction to a distal end which in several embodiments is generally coextensive and aligned with the second distal end of the outer tubular sidewall. A circular bore, threaded along at least a portion of the length is formed through the elongated portion and extends from the distal end thereof along the longitudinal axis and communicates with an aperture formed through the base wall. In one preferred embodiment a reverse bend in a radially extending, circumferential flange formed in the intermediate third portion of the outer tubular sidewall is used to facilitate a calibration procedure by providing a surface to hold the device against a fluid pressure source. In a modified embodiment a circumferential groove is provided in the intermediate third portion which provides a holding surface for the calibration procedure while minimizing the transfer of any forces to the pressure sensing assembly incident to the procedure. In either embodiment a mechanical lock is preferably provided to prevent relative axial movement between the outer tubular sidewall and the plastic body by means of an annular recess formed in the intermediate third portion, the recess projecting radially outwardly in the first embodiment and radially inwardly in the modified embodiment. According to a feature of the invention, the second distal end of the second portion of the outer tubular sidewall extends to a point along the longitudinal axis in the second direction at least as far as the distal end of the elongated portion of the plastic body so that when the apparatus is installed on a coupling of a fluid pressure source the metallic outer tubular sidewall bottoms out to minimize any decrease in release torque required for removal of the apparatus. The outer tubular sidewall also results in placing the plastic body in compression as the housing member is screwed onto a coupling and torque is applied to obtain a tight seal preventing outward buckling of the sidewall of the plastic body. According to another feature of the invention, a discontinuous annular land surface is formed in the base wall facing the open end of the housing member to facilitate certain leakage testing of the apparatus. According to another modification, a helical, annular metal insert is shown locked in the plastic body disposed to form a continuation of the threaded portion extending over a minor portion, preferably at least one turn of the thread, i.e., over 360° of the thread, to reinforce the threaded portion against stripping. Yet another embodiment shows a helical groove formed in the outer tubular sidewall which forms a continuation of the plastic thread over a minor portion of the length of the threaded portion to provide reinforcement against stripping.

The sensor assembly, such as a capacitive transducer or a pressure switch with a diaphragm movable between opposite dished configurations, is disposed in a cavity formed by the cylindrical first portion of the outer tubular sidewall with the first distal end crimped over an electrical connector which closes the open end of the housing member.

BRIEF DESCRIPTION OF THE DRAWINGS

Other objects, advantages and details of the novel and improved condition responsive electrical apparatus of the invention appear in the following detailed description of preferred embodiments of the invention, the detailed description referring to the drawings in which.

DETAILED DESCRIPTION OF PREFERRED EMBODIMENTS

Pressure responsive devices of various types employ a housing having a fluid pressure interface portion comprising an external hexagonal configuration with a fluid port formed along the longitudinal axis of the interface portion leading to a recess which receives a pressure sensing mechanism. Typically, the recess is closed by an electrical connector which is clamped onto the housing by crimping the outer distal ends of the wall forming the recess over a portion of the connector.

Figure 1:
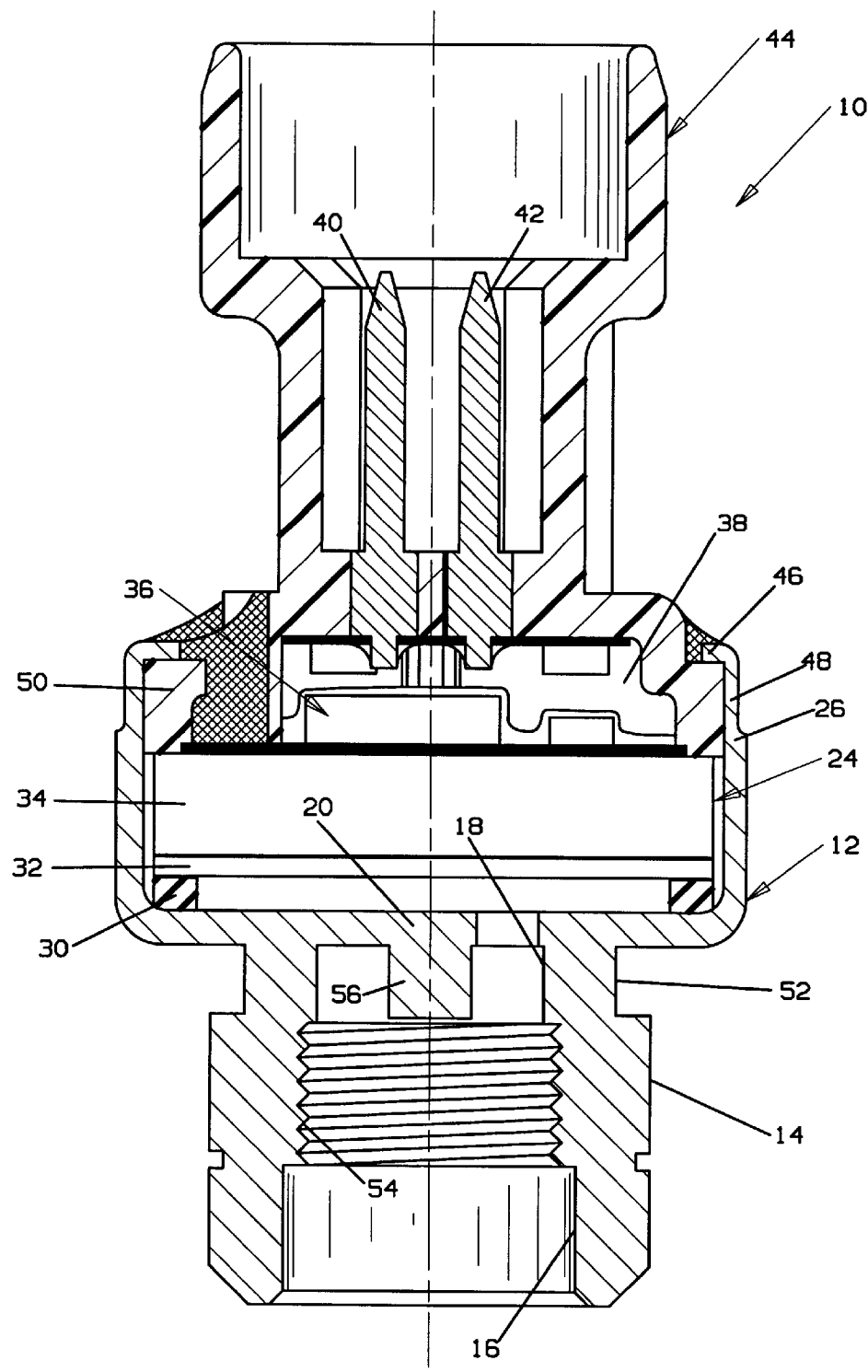
FIG. 1 is a cross sectional view of a prior art fluid pressure transducer.

As seen for example in FIG. 1, a pressure responsive capacitive transducer 10 is shown comprising a unitary housing member 12 which serves both as an interface for coupling the transducer to a fluid pressure source and as a housing for mounting pressure sensing assembly 24. Housing member 12 has a first portion 14 formed in a non-circular, e.g., hexagonal, configuration to facilitate installation and removal of the transducer to a coupling in a fluid pressure line. A fluid port 16 is formed through first portion 14 and leads through aperture 18 in bottom wall 20 into a cavity formed by a generally cylindrical sidewall 26 of housing member 12. Pressure sensing assembly 24 is disposed in the cavity with a suitable flexible gasket 30 placed between assembly 24 and bottom wall 20 to form a fluid seal. Pressure assembly 24 comprises a flexible ceramic diaphragm 32 mounted on a flat disc shaped ceramic base 34 with opposed face surfaces separated from one another in closely spaced, aligned relation. A metallic layer is disposed on each face surface (not shown) to serve as capacitor plates and provide a capacitor whose output varies in dependence with deflection of diaphragm 32 caused by pressure of fluid received through port 16. Pressure responsive transducers of this type are well known and are shown and described, for example, in U.S. Pat. No. 4,875,135 assigned to the assignee of the present invention, the subject matter of which is incorporated herein by this reference.

The metallic layers on diaphragm 32 and base 34 are connected to suitable electronic conditioning circuitry 36 disposed in chamber 38 which in turn is connected to the transducer terminals, two of which 40, 42, are shown in FIG. 1 for providing an electrical signal corresponding to the pressure applied to the capacitive transducer. Transducer terminals 40, 42 are mounted in an electrically insulative connector 44 which is attached to housing member 12 by crimping the outer distal end portion 46 of an attenuated outer wall 48 onto a circumferential flange portion 50 of connector 44.

Housing member 12 is typically provided with an undercut circumferential portion 52 having a diameter less than the diameter of a circle encompassing hexagonal portion 14 in order to provide a convenient surface to hold the device while applying pressure through port 16 to check for leakage and the like. Housing member 12 is also provided with female threaded portion 54 extending along a portion of the length of port 16 and a centrally disposed projection 56 which extends from wall 20 into port 16 toward the mouth of the port to serve as an automatic valve deflator so that upon screwing housing member 12 onto a coupling of a fluid pressure line the valve in the coupling will automatically be opened to allow fluid into transducer 10.

Figure 2:
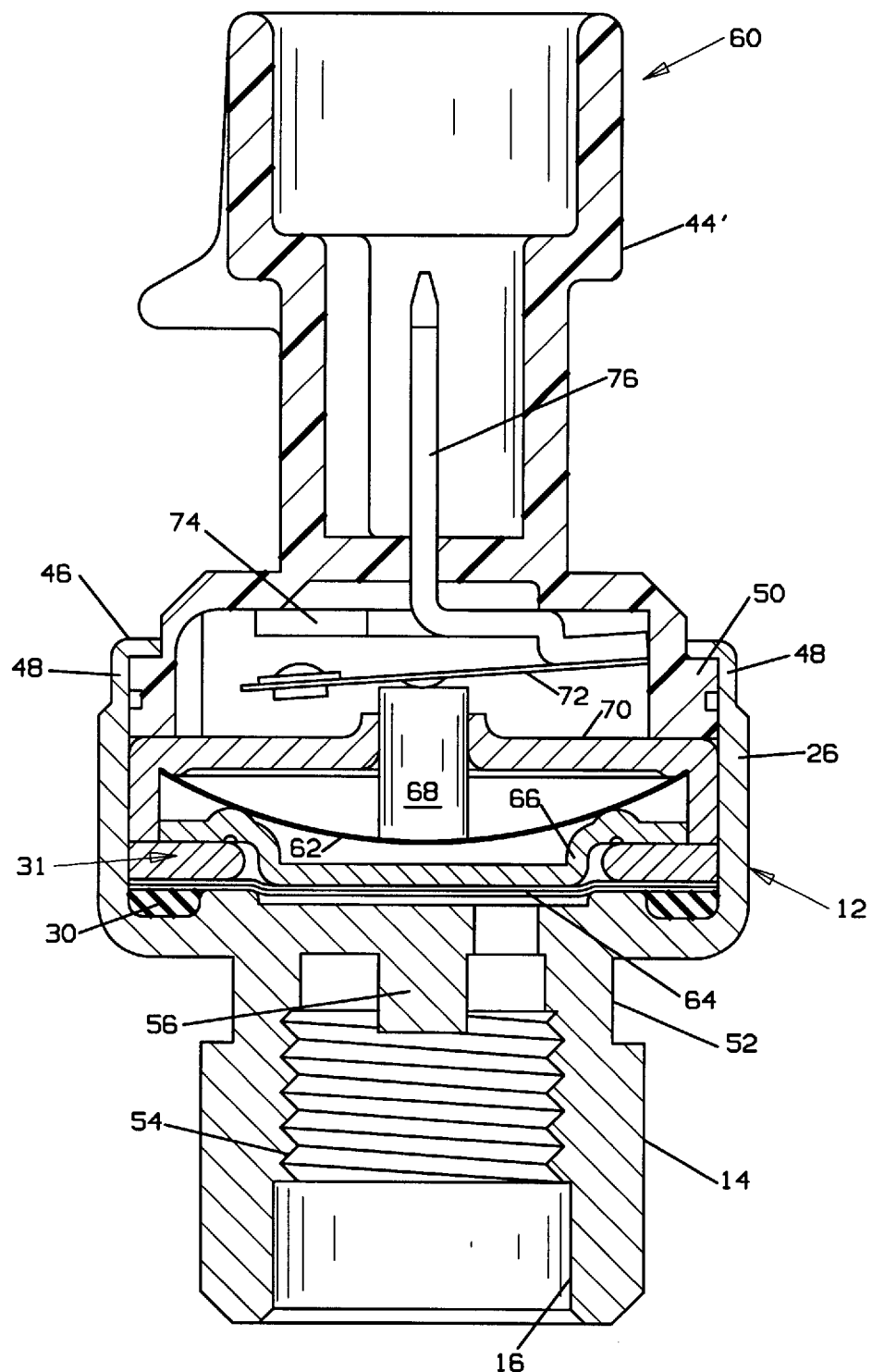
FIG. 2 is a cross sectional view similar to FIG. 1 of a prior art fluid pressure switch.

Turning now to FIG. 2, housing member 12 is shown used for a conventional pressure responsive electrical switch 60 in which the pressure sensing assembly comprises a snap-acting disc 62 which is adapted to move between oppositely dished configurations. When fluid pressure is received through port 16 and is above a selected value, disc 62 will snap from the configuration shown to an oppositely dished configuration (not shown). The fluid pressure acts through flexible sealing diaphragms 64 to move disc actuator plate 66 upwardly applying a force on disc 62. When disc 62 snaps to its oppositely dished configuration, motion is transferred to pin 68 slidably mounted in guide 70 which in turn moves movable electrical contact arms 72 so that it moves into electrical engagement with stationary electrical contact 74. Suitable terminals mounted in connector 44' provide electrical connection with the electrical switch including terminal 76 connected to movable arm 72 and another terminal (not shown) connected to stationary contact 74. Connector 44' is attached to housing member 12 in the same manner as in FIG. 1 with wall portion 48 crimped onto flange portion 50 applying a force through guide 70 and washer 31.

Figure 3:
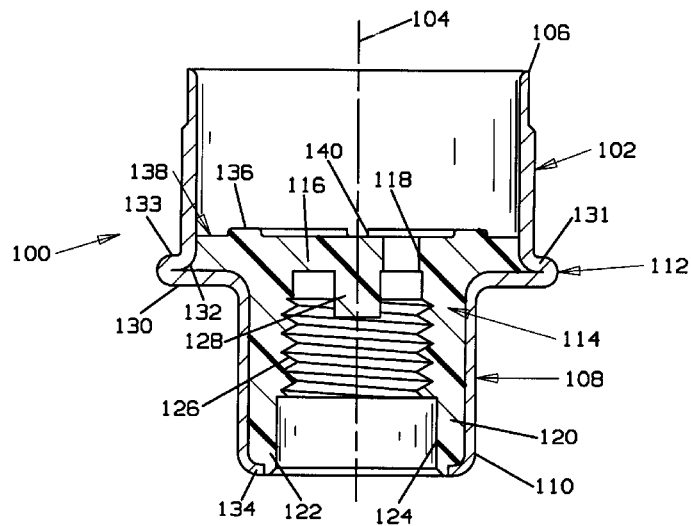
FIG. 3 is a cross sectional view drawn in a slightly smaller scale of an improved housing member made in accordance with the invention and useful in the FIGS. 1 and 2 apparatus.
Figure 4:
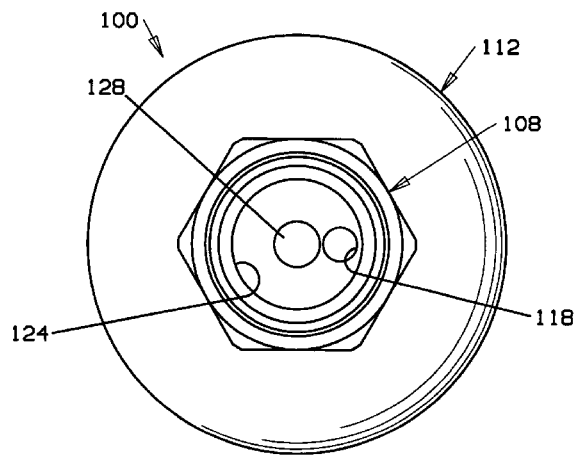
FIG. 4 is a bottom view of the FIG. 3 structure.

With reference to FIGS. 3 and 4, an improved, low cost housing made in accordance with the invention is shown which can accommodate various pressure sensing assemblies such as the transducer of FIG. 1 and the pressure switch of FIG. 2. Housing member 100 comprises a tubular sidewall having a generally cylindrical first portion 102 extending in a first direction along a longitudinal axis 104 to a first distal end 106, a second portion 108 having a non-cylindrical section, preferably hexagonal, extending in a second, opposite direction along the longitudinal axis to a second distal end 110 and a third intermediate portion 112. An inner, plastic body member 114 is disposed within the tubular sidewall and has a base wall portion 116 extending across the outer tubular sidewall and lying in a plane generally perpendicular to longitudinal axis 104 and generally aligned with third portion 112 of the tubular sidewall. A fluid receiving aperture 118 is formed through the base wall portion. Body member 114 has an elongated portion 120 extending from base wall portion 116 along the longitudinal axis within second portion 108 of the tubular sidewall and is generally coextensive in length therewith having a distal end 122 generally aligned with second distal end 110 of the tubular sidewall. The elongated portion 120 is provided with a circular bore 124 which extends along longitudinal axis 104 and communicates with aperture 118. Bore 124 is formed with a screw thread 126 over at least a portion of its length. Preferably, a centrally disposed stop projection 128 extends from base wall portion 116 in a direction toward distal end 122 and serves as a valve deflator so that when a device incorporating housing 100 is screwed onto a fluid line coupling the valve and the coupling valve will automatically be opened allowing fluid to enter through aperture 118.

Body member 114 is formed of suitable high strength plastic and preferably insert molded in place within the metallic tubular sidewall. The tubular wall is composed of ductile metal such as cold rolled steel and may be formed in sequential drawing steps.

The third, intermediate portion 112 is formed with a radially extending flange 130 having a circumferential reverse bend portion 131 having an outwardly extending surface 133 on a side of flange 130 remote from the pressure source inlet at distal end 110 which provides a convenient surface to prevent movement of the apparatus during leakage tests and the like. In forming the reverse bend 131, an annular recess 132 is formed in the sidewall which serves as a mechanical lock for body member 114 preventing longitudinal movement relative to the tubular sidewall. The outer part of the first portion 102 adjacent to distal end 106 is formed with an attenuated wall having a reduced thickness, as by swaging, to facilitate crimping of the wall to a portion of a connector or the like of the pressure responsive electrical apparatus.

As noted above, distal end 110 of the tubular sidewall and distal end 122 of body member 114 are generally coextensive in length. As seen in FIG. 3, distal end 110 extends radially inwardly at 134 so that the outer metal sidewall will bottom out when screwing the housing onto a threaded coupling providing a consistent release torque for the apparatus. If the plastic material of body member 114 were relied on to provide the release torque, the plastic would relax over time thereby decreasing the release torque resulting in seal problems.

Base wall portion 116 is preferably formed with an annular land 136 which serves to define a seat 138 for a suitable O-ring gasket, e.g., gasket 30 of FIG. 1. One or more slots 140 may be formed in land 136 to facilitate leakage testing. That is, in the event that the O-ring gasket is inadvertently left out upon assembly, fluid will be able to pass through slots 140 even though a pressure sensing assembly, e.g., assembly 22 of FIG. 1, is in intimate physical contact with land 136 thereby enabling the testing mechanism to detect that condition.

Figure 5:
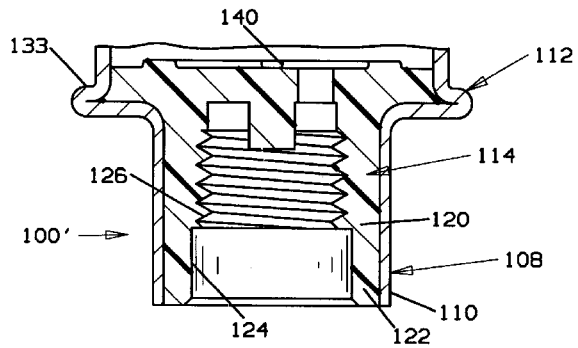
FIG. 5 is a view similar to FIG. 3 and partially broken away showing a modified embodiment.

A modification of the housing is shown in FIG. 5 in which the second distal end 110 of the metallic sidewall of housing 100', while being coextensive in length with distal end 122 of body member 114 is not turned radially inwardly; however, the metallic sidewall will still be determinative in providing the release torque due to bottoming out upon installation of the apparatus on a fluid pressure line coupling.

Figure 6:
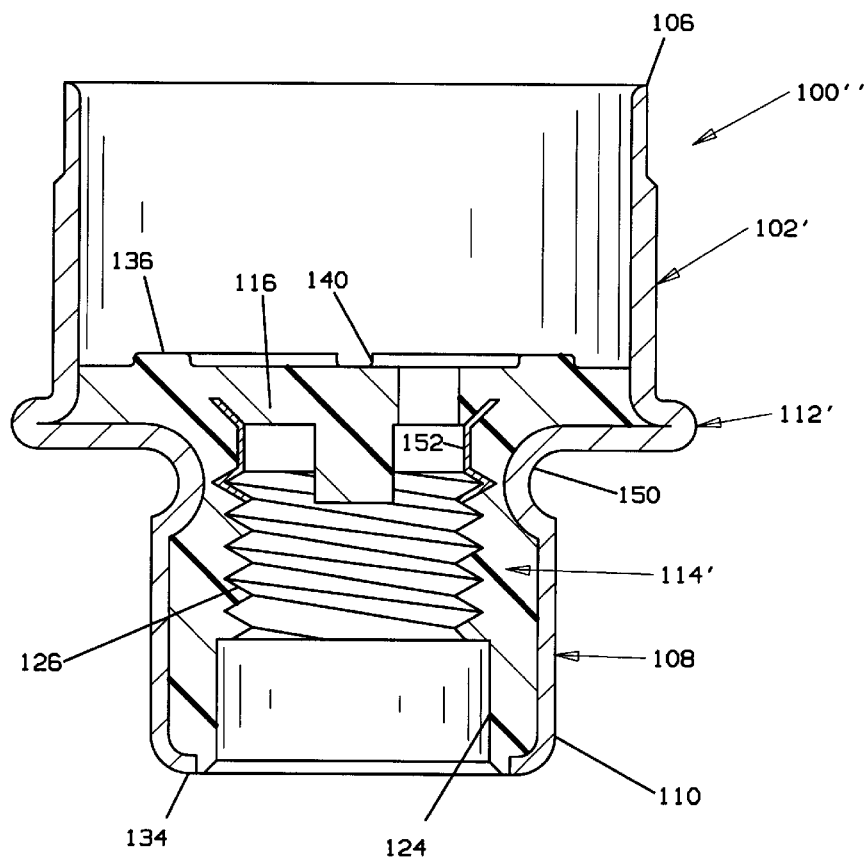
FIG. 6 is a cross sectional view drawn using the same scale as that used in FIGS. 1 and 2 of another modification of the FIG. 3 housing member.
Figure 7:
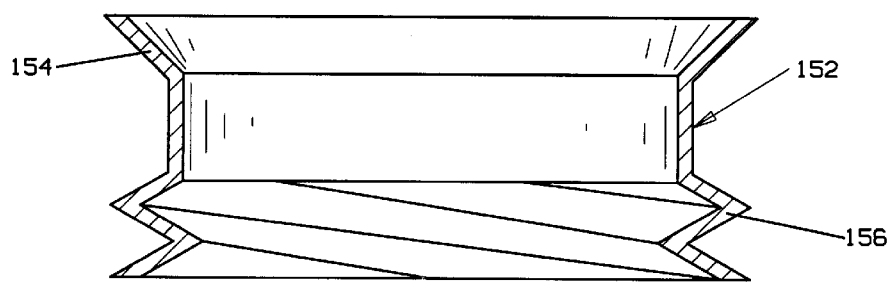
FIG. 7 is an enlarged cross sectional view of a reinforcing insert used in the FIG. 6 embodiment.

Another modification of the FIG. 3 embodiment is shown in FIG. 6 in which the third, intermediate portion of the housing member 100" is provided with a circumferential groove 150 to provide a feature for holding the housing member during pressurization. Groove 150 more effectively decouples the holding force used during pressurization and prevents it from being transferred to the pressure sensing assembly. FIG. 6 also includes a helical annular insert 152, shown enlarged in FIG. 7, which may be insert molded in body member 114' in order to reinforce threaded section 126 and obviate any possibility of stripping, particularly when housing member 100" is to be used with high pressure fluids. Annular insert 152, formed of suitable material such as brass, has a collar portion 154 for anchoring in wall 116 of plastic body member 114' and a thread portion 156 which serves as a continuation of the plastic thread and extends over a minor portion of the total length of thread portion 156, preferably at least 360° (one turn), to improve overall thread strength.

Figure 8:
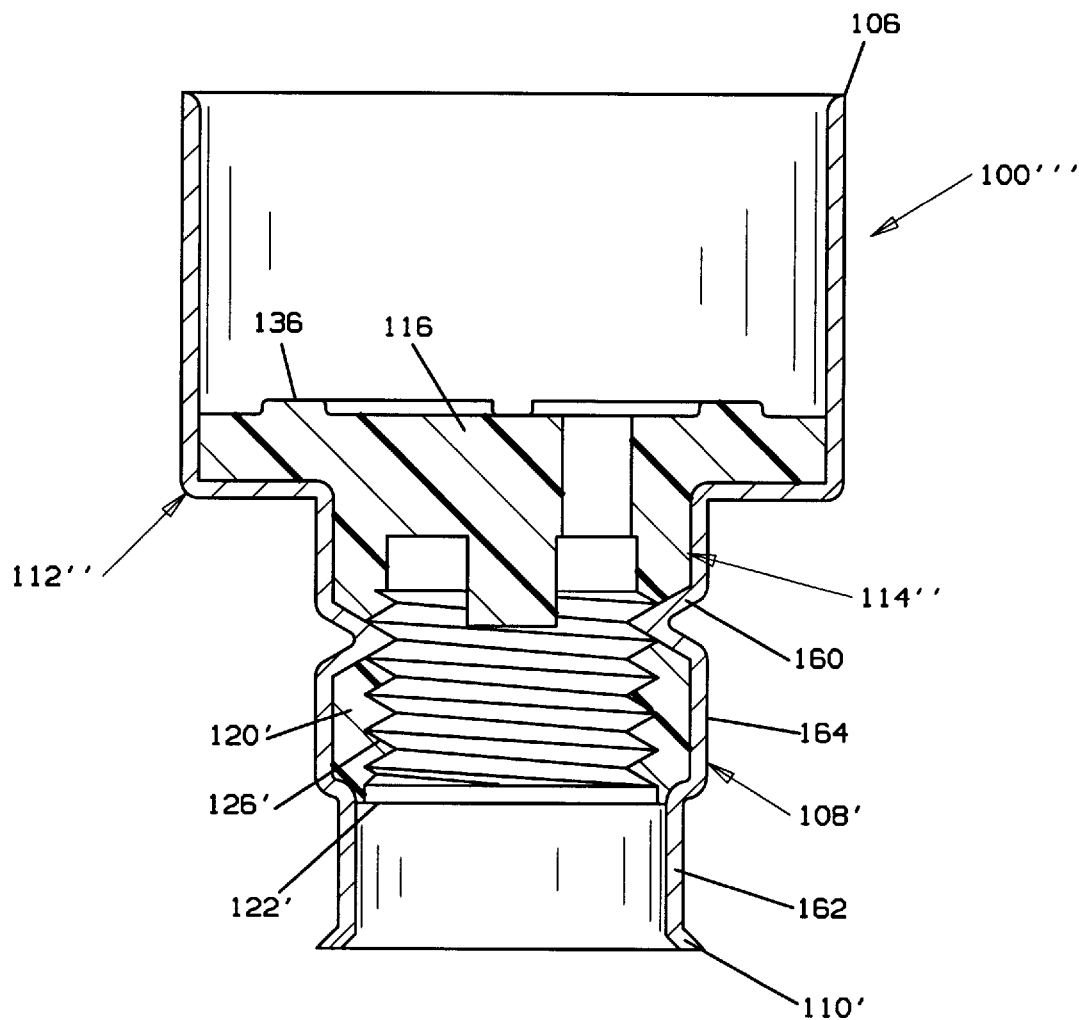
FIG. 8 is a cross sectional view similar to FIG. 6 of another modification of the FIG. 3 housing member.

Yet another modification of the FIG. 3 embodiment is shown in FIG. 8. The outer tubular sidewall 108' of housing member 100''' is formed with an annular helical groove 160 in the second portion 108' which serves both as a surface for holding the device during leakage tests and the like as well as reinforcing the molded plastic thread in plastic body 114". Inwardly extending groove 160 extends over a minor portion of the length of the threaded portion, preferably at least 360°, i.e., one turn. Groove 160 is preferably discontinuous so that the threaded portion 126' is integral with base wall portion 116 with the connection extending between respective discontinued portions of groove 160. Although groove 160 is shown disposed at one end of the molded thread it could, if desired, be placed at other locations along the length of the threaded portion 126'. The outer portion 162 of second portion 108', beyond hexagonal configured section 164, is cylindrically formed in order to accommodate a sealing o-ring (not shown). Distal end 122' of body 114''' extends just beyond threaded portion 126' so that the o-ring can seal directly on the outer tubular sidewall 108'.

It should be understood that although particular embodiments have been described by way of illustrating the invention, the invention includes all modifications and equivalents of the disclosed embodiments falling within the scope of the appended claims.

What is claimed:

1. A condition responsive electrical apparatus having a housing member with a fluid receiving port, the housing member having an open end and defining a sensor receiving cavity, a condition responsive sensor received in the sensor receiving cavity, an electrical connector member disposed at and closing the open end, the housing member comprising an outer tubular, metallic sidewall having a longitudinal axis, the sidewall having a generally cylindrical first portion extending in a first direction along the longitudinal axis to a first distal end and a second portion extending in a second direction, opposite to the first direction, along the longitudinal axis to a second distal end and a third portion intermediate to the first and second portions and an inner plastic body having a base wall portion extending across the outer tubular sidewall and lying in a plane generally perpendicular to the longitudinal axis and generally aligned with the third portion of the outer tubular wall, a fluid receiving aperture formed through the base wall portion, the plastic body having an elongated portion extending from the base wall portion of the plastic body in the second direction along the longitudinal axis within the second portion of the outer tubular sidewall to a distal end, the second distal end of the outer tubular sidewall extending along the longitudinal axis at least as far as the distal end of the elongated portion of the plastic body, the elongated portion of the plastic body having a circular bore with a length extending along the longitudinal axis in communication with the fluid receiving aperture to the distal end of the elongated portion, the bore formed with a screw thread over at least a portion of the length of the bore.

2. A condition responsive electrical apparatus according to claim 1 in which the second distal end of the outer tubular wall is bent to extend radially inwardly with the second distal end of the outer tubular sidewall and the distal end of the elongated portion of the plastic body lying generally in the same plane perpendicular to the longitudinal axis.

3. A condition responsive electrical apparatus according to claim 1 in which the second distal end of the second portion of the tubular sidewall is generally coextensive with the distal end of the elongated portion of the plastic body.

4. A condition responsive electrical apparatus according to claim 1 in which the intermediate third portion of the outer tubular wall includes a radially outwardly extending wall having a circumferential reverse bend portion.

5. A condition responsive electrical apparatus according to claim 1 in which the intermediate third portion of the outer tubular wall includes a circumferentially extending groove.

6. A condition responsive electrical apparatus according to claim 1 in which the second portion of the outer tubular sidewall has a non-cylindrical section and the intersection of a plane perpendicular to the longitudinal axis and the non-cylindrical section of the second portion of the outer tubular sidewall forms a hexagonal outer configuration.

7. A condition responsive electrical apparatus according to claim 1 in which the generally cylindrical first portion of the outer tubular sidewall is attenuated in thickness adjacent the first distal end to facilitate crimping of the outer tubular sidewall onto the electrical connector member.

8. A condition responsive electrical apparatus according to claim 1 further comprising a stop surface projecting from the base wall portion of the plastic body into the bore of the elongated portion to serve as a valve deflator.

9. A condition responsive electrical apparatus according to claim 1 further comprising a generally annular land formed in the base wall portion facing the open end of the housing member, the annular land being discontinuous forming at least one radially extending passageway.

10. A condition responsive electrical apparatus according to claim 1 in which the plastic body is insert molded in the housing member and in which the intermediate third portion of the outer tubular wall has a circumferentially extending recess which forms a mechanical lock preventing movement along the longitudinal axis of the outer tubular sidewall relative to the plastic body.

11. A condition responsive electrical apparatus according to claim 1 in which the condition responsive sensor is a pressure responsive capacitive transducer.

12. A condition responsive device according to claim 1 in which the condition responsive sensor is a pressure responsive switch including a diaphragm movable between first and second dished configurations.

13. A condition responsive electrical apparatus according to claim 1 further comprising a screw thread reinforcing means to increase the overall strength of the screw thread formed in the bore of the plastic body.

14. A condition responsive electrical apparatus according to claim 13 in which the screw thread reinforcing means comprises inwardly extending grooved portions of the second portion of the metallic sidewall, the grooved portions forming a continuation of the thread formed in the bore of the plastic body.

15. A condition responsive electrical apparatus according to claim 1 further comprising a helical annular metal insert mounted in the plastic body, the insert having a screw thread extending at least approximately 360°, the screw thread forming a continuation of the thread formed in the bore of the plastic body.

16. A condition responsive electrical apparatus according to claim 15 in which the annular metal insert has a collar portion anchored in the plastic body.

17. A condition responsive electrical apparatus having a housing member with a fluid receiving port, the housing member having an open end and defining a sensor receiving cavity, a condition responsive sensor received in the sensor receiving cavity, an electrical connector member disposed at and closing the open end, the housing member comprising an outer tubular, metallic sidewall having a longitudinal axis, the sidewall having a generally cylindrical first portion extending in a first direction along the longitudinal axis to a first distal end and a non-cylindrical second portion extending in a second direction, opposite to the first direction, along the longitudinal axis to a second distal end and a third portion intermediate the first and second portions and an inner plastic body having a base wall portion extending across the outer tubular sidewall and lying in a plane generally perpendicular to the longitudinal axis and generally aligned with the third portion of the outer tubular wall, a fluid receiving aperture formed through the base wall portion, the plastic body having an elongated portion extending from the base wall portion of the plastic body in the second direction along the longitudinal axis within the second portion of the outer tubular sidewall to a distal end, the elongated portion of the plastic body having a circular bore extending along the longitudinal axis in communication with the fluid receiving aperture to the distal end of the elongated portion, the bore formed with a screw thread over at least a portion of the length of the bore and metallic means extending over a minor portion of the screw thread to increase the overall strength of the screw thread formed in the bore of the plastic body.

18. A condition responsive electrical apparatus according to claim 17 in which the metallic means to increase the overall strength of the screw thread comprises inwardly extending groove portions of the outer tubular sidewall which form a continuation of the screw thread formed in the bore of the plastic body.

19. A condition responsive electrical apparatus according to claim 17 in which the metallic means is a generally annular metal insert mounted in the plastic body, the metal insert having a screw thread extending at least approximately 360°, the screw thread forming a continuation of the thread formed in the bore of the plastic body.

20. A condition responsive electrical apparatus according to claim 19 in which the metal insert has a collar portion anchored in the plastic body.

21. A condition responsive electrical apparatus according to claim 17 in which the condition responsive sensor is a pressure responsive capacitive transducer.

22. A condition responsive device according to claim 17 in which the condition responsive sensor is a pressure responsive switch including a diaphragm movable between first and second dished configurations.

\* \* \* \* \*